April 17, 1928.

J. McDONALD 1,666,747

LIQUID FUEL BURNING FURNACE

Filed Sept. 27, 1923    2 Sheets-Sheet 1

INVENTOR
James McDonald
BY
ATTORNEY

April 17, 1928.

J. McDONALD 1,666,747

LIQUID FUEL BURNING FURNACE

Filed Sept. 27, 1923　　2 Sheets-Sheet 2

INVENTOR
James McDonald
BY
*[signature]*
ATTORNEY

Patented Apr. 17, 1928.

1,666,747

UNITED STATES PATENT OFFICE.

JAMES McDONALD, OF NEW YORK, N. Y., ASSIGNOR TO WHITE FUEL OIL ENGINEERING CORPORATION, OF NEW YORK, N. Y., A CORPORATION OF NEW YORK.

LIQUID-FUEL-BURNING FURNACE.

Application filed September 27, 1923. Serial No. 665,047.

This invention relates to liquid fuel burning furnaces using natural draft and my improvements are directed to certain novel features and structural arrangements in a burner apparatus whereby it is enabled to serve the following among other purposes:

1. The burner apparatus includes a double venturi or air supply means characterized as comprising a smaller and a larger opening, each with independent air communicating means, whereof the supply to the larger opening may be shut off to leave access only to the smaller opening when the furnace is to be operated on a restricted fuel supply.

2. The air control means in and forming part of the apparatus are so devised and arranged that whether the air admission means to the furnace be all open, or some of them closed, they at all times serve as baffles to prevent direct outward radiation of heat from the furnace.

3. Each of the venturi devices or air supply tubes are provided with inwardly sloped or curved walls for the purpose of centering the flow of air toward the burner flame.

Other features and advantages of my invention will hereinafter appear:

Figure 1:
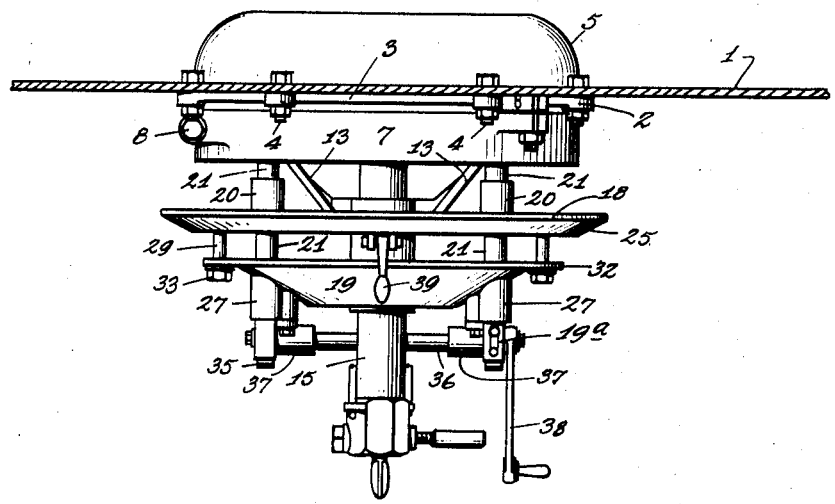
Figure 1 is a top plan view of my improved apparatus for natural draft furnaces.
Figure 2:
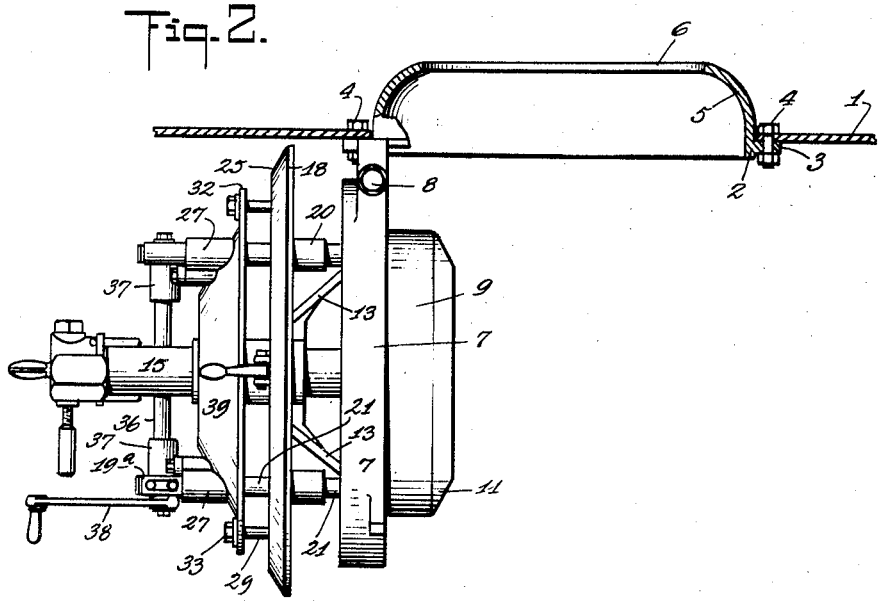
Fig. 2 is a similar view showing the apparatus as swung open.
Figure 3:
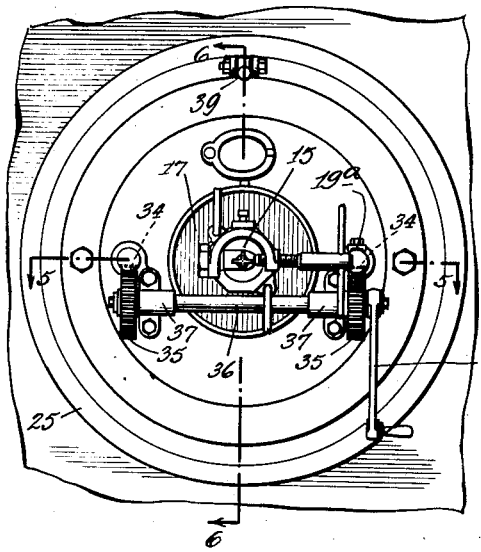
Fig. 3 is a forward elevation of a furnace having my improved apparatus applied thereto.

In said views let 1 indicate the front wall of a furnace which is provided with an opening through which liquid fuel and air are admitted for combustion. Entered within this opening is an air supply tube 2, generally termed a Venturi tube, it being provided with a flange 3 by which it is secured to the furnace wall 1 as by bolts 4. This air tube is here shown as inwardly dished, to provide the curved guide wall 5, with a central clearance 6 of relatively large area for air admission.

An annulus 7, of the same diameter as tube 2, is adapted to fit in aligned relation therewith, said annulus and tube being pivotally connected, as at 8, so that the annulus can be swung into both open and closed positions.

This ability of the annulus 7 to swing in the manner indicated is desirable because said annulus carries the other elements of which the burner apparatus is composed, and obviously, when swung open, access may readily be had to the burner and other associated parts.

It is a feature of my present invention to provide restricted air supply means to the furnace when a proportionate liquid fuel supply is in operation for furnishing less than the maximum heat of which the furnace is capable. To this end a smaller Venturi or air supply tube 9 is provided, being here shown as engaged with the annulus 7 by means of webs 10, which support it in the closed position of the apparatus in nested, spaced relation with the air tube 2. Said air supply tube 9 has the forward portion of its wall inwardly inclined, as at 11, for convergence of air flowing therethrough, as with the larger air tube 2; and its opening 12 is of smaller diameter than the opening 6. Arms 13 which extend rearwardly from the interior surface of tube 9 carry a sleeve 14, which supports a burner tube 15 in slidable relation therewith, a set screw 16 serving to fix the burner tube in a set position. It should be noted that the sleeve 14 carries a disk-like flange 17, whose function will be referred to hereinafter.

An annular plate or air control ring 18 and a cover plate 19 are included among the elements of my burner apparatus construction, and will now be described. The ring 18 is provided with tubular portions 20, 20, slidably mounted respectively on guide posts 21, 21 that are suitably secured, as by nuts 22, in lugs 23, 23 extended from the interior surface of air tube 9. The air control ring 18 is therefore slidable to and from the outer peripheral edges of annulus 7 and air tube 9; and, since these edges lie in the same vertical plane, the ring 18 may be moved against said edges to thus close the passage 24 which allows air to pass direct to the larger opening 6. Also, when the ring 18 is moved away an appropriate distance to uncover passage 24, it then answers the purpose of a baffle, to prevent the direct radiation of furnace heat into the furnace room. An inwardly inclined flange 25 on the ring 18, extended beyond the peripheral surface of annulus 7, enhances this characteristic of the ring 18 to prevent direct heat radiation.

The opening 26 through ring 18 serves for the passage of air to the smaller air supply tube 9 when said ring is moved to close air passage 24.

The cover plate 19, which is concavo-convex in form, is provided with bosses 27, 27 by which it also is slidably mounted on the posts 21, 21; and has a central opening 28, through which air will pass to supply tube 9. This opening 28 is however guarded by disk 17, which serves as a baffle to prevent direct radiation of furnace heat outwardly through said opening. Also, the outer portion of opening 26 in ring 18 is guarded by the cover 19 to prevent the direct outward radiation of furnace heat.

The means whereby the cover plate 19 and air control ring 18 are interconnected and operated are as follows:

Bolts 29 secured as by nuts 30 to the air control ring 18 extend outwardly therefrom and pass freely through holes 31 provided therefor in the flange portion 32 of cover plate 19, nuts 33 limiting the extent of separating movement between the ring 18 and cover plate 19, but permitting the cover plate to be closed against the ring 18.

The posts 21 are each provided with teeth to provide racks 34, 34, and toothed sectors 35, 35, carried by a shaft 36, revoluble in bearings 37, 37 on cover plate 19 are meshed respectively with said racks, said shaft being operable by a handle 38 to move the cover plate to and from the furnace.

Figure 4:
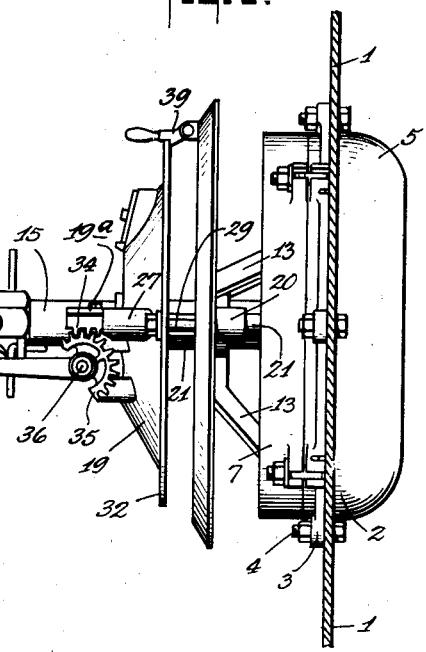
Fig. 4 is a side elevation thereof showing the air supply means as fully open.
Figure 5:
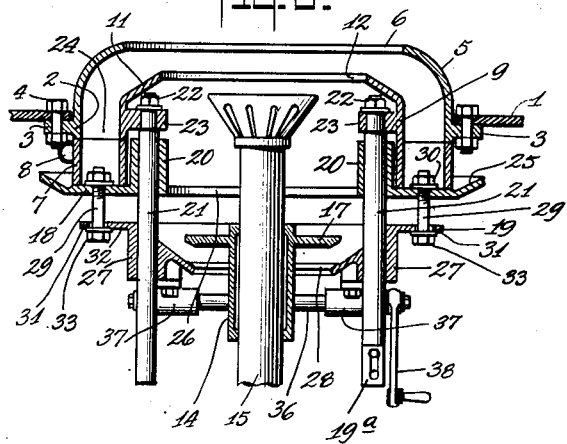
Fig. 5 is a section on the line 5—5 of Fig. 3, showing the outer air supply means closed.
Figure 6:
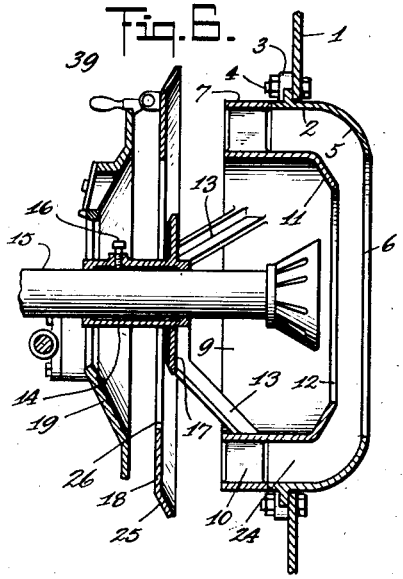
Fig. 6 is a section on the line 6—6 of Fig. 3 showing both inner and outer supply means in open position.

In Fig. 5 the air ring 18 is seen to be in closed position, covering the air passage 24, with the cover plate extended from said ring 18 to the limit of their relative movement. In this position of the several elements air is supplied to the furnace only through the opening 12 of the smaller Venturi tube 9. By continued rotation of shaft 36 in the same direction, the toothed sectors will extend the outward movement of cover plate 19 to an adjustable stop 19ª, during which movement the air control ring 18, through connecting bolts 29, will also be withdrawn to the position shown in Figs. 4 and 6, thus permitting air to reach the larger opening 6 through passage 24, besides passing through the smaller air tube 9.

The air ring 18 may be locked in its set spaced position relatively to the cover plate by means of a catch member 39, pivoted to the air control ring, and having a handle by which it may be swung into engagement with the flange of the cover plate.

Variations within the spirit and scale of my invention are equally comprehended by the foregoing disclosure.

I claim:

1. A burner apparatus for liquid fuel furnaces having a pair of air supply tubes, one of said tubes being housed within the other to provide an air passage between the two, and an annular plate movable axially of said tubes to approach and recede from the outer end of the space between the tubes whereby to regulate the flow of air therethrough said annular plate having a control clearance to expose the opening through the inner tube.

2. A burner apparatus for liquid fuel furnaces having a pair of air supply tubes concentrically arranged to provide an annular air passage and a central air inlet, the rear ends of said tubes being flush with each other, and an annular plate movable toward and from said rear ends to cover and uncover the space between said tubes said annular plate having a central clearance to expose the central air inlet.

3. A burner apparatus for liquid fuel furnaces having a pair of air supply tubes concentrically arranged to provide an annular air passage and a central air inlet, the rear ends of said tubes being flush with each other, an annular plate movable toward and from said rear ends to cover and uncover the space between said tubes, said annular plate having a central clearance to expose the central air passage, and means independent of said plate for closing the inner tube.

4. A burner apparatus for liquid fuel furnaces having a pair of air supply tubes concentrically arranged to provide an annular air passage and a central air inlet, the rear ends of said tubes being flush with each other, and an annular plate movable toward and from said rear ends to cover and uncover the space between said tubes, said annular plate having a central clearance to expose the central air passage and being of greater diameter than the outer tube whereby to project therebeyond.

5. A burner apparatus for liquid fuel furnaces having a pair of air supply tubes concentrically arranged to provide an annular air passage and a central air passage, the rear ends of said tubes being flush with each other, and an annular plate movable toward and from said rear ends to cover and uncover the space between said tubes, said annular plate having a central clearance to expose the central air passage and being of greater diameter than the outer tube whereby to project therebeyond, said projecting portion being inclined forwardly with respect to the body of said plate.

6. A burner apparatus for liquid fuel furnaces having a pair of air supply tubes concentrically arranged to provide an annular air passage, the rear ends of said tubes being flush with each other, an annular plate movable toward and from said rear ends to cover and uncover the space between said tubes, said annular plate being of greater diameter than the outer tube whereby to project therebeyond; and means independent of said plate for closing the inner tube.

7. A burner apparatus for liquid fuel furnaces having a pair of air supply tubes concentrically arranged to provide an annular air passage, the rear ends of said tubes being flush with each other, an annular plate movable toward and from said rear ends to cover and uncover the space between said tubes, said annular plate being of greater diameter than the outer tube whereby to project therebeyond, the projecting portion being inclined forwardly with respect to the body of said plate, and means independent of said plate for closing the inner tube.

8. A burner apparatus for liquid fuel furnaces having a pair of concentrically arranged air supply tubes and a central burner nozzle, said air supply tubes having their inner ends directed inwardly and their outer ends in the same plane, an annular plate movable toward and from the outer ends of said air supply tubes and proportioned to cover the space between said tubes when moved toward the same, and means to close the opening in said annular plate.

9. A burner apparatus for liquid fuel furnaces having a pair of concentrically arranged air supply tubes whose inner ends are directed inwardly and whose outer ends are in the same plane, an annular plate movable toward and from the outer ends of said air supply tubes and proportioned to cover the space between said tubes when moved toward the same, and means to close the opening in said annular plate, said annular plate having its outer periphery projecting beyond the outer tube and inclined forwardly with respect to the body of the plate.

10. A burner apparatus for liquid fuel furnaces, having a relatively large air supply tube fitted thereto, an annulus in hinged relation to said supply tube, a relatively small air supply tube carried by said annulus and disposed in spaced relation to said supply tube of relatively large diameter, leaving a concentric passage between said supply tubes, individual admission means to said supply tubes, and means for controlling the individual admission means to the supply tube of relatively large diameter.

11. The combination with a liquid fuel furnace, of a relatively large air supply tube fitted thereto, an annulus in hinged relation to said supply tube, a relatively small air supply tube carried by said annulus and disposed in spaced relation within said annulus and said relatively large supply tube to provide a concentric intermediate passage, and an air control ring movable to close and open said passage.

12. The combination with a liquid fuel furnace, of a relatively large air supply tube fitted thereto, an annulus in hinged relation to said supply tube, a relatively small air supply tube carried by said annulus and disposed in spaced relation with said annulus and said relatively large supply tube to provide a concentric intermediate passage, and an air control ring movable to close and open said passage, said air ring when moved to open said passage serving as a baffle to prevent the direct outward radiation of furnace heat.

13. The combination, with a liquid fuel furnace, an air supply tube therefor and a cover plate provided with a central opening and movable between its open and closed positions, of a central disk carried by said supply tube in spaced relation therefrom to serve as a baffle in preventing the direct outward radiation of furnace heat when the cover plate is moved to its open position.

14. The combination, in a liquid fuel furnace, of separate air supply means therefor of different capacities and respective closure means for closing said supply means separately, said closure means, when open, respectively serving as baffles to prevent the direct outward radiation of furnace heat.

15. The combination, in a liquid fuel furnace, of separate air supply means therefor of different capacities, respective axially movable closure means for closing said supply means successively, hand actuable means to operate said respective closure means for successive closing thereof, and connecting means between said closure means operable to open one of said closure means in the continued outward movement of the other closure means after the opening thereof.

16. The combination, in a liquid fuel furnace, of an air supply tube of relatively large diameter, an air supply tube of relatively small diameter, said smaller supply tube lying in spaced relation within said larger supply tube to provide a delivery passage for the latter, an air control ring movable to open and close said delivery passage, a cover plate movable toward and from said air control ring, and means for locking said cover plate in spaced relation from said air control ring.

17. A burner apparatus for liquid fuel furnaces having a pair of spaced concentric air supply tubes, an annular plate movable toward and from said tubes to close and open the outer end of the space between the tubes, said plate provided with a central opening, means to close the opening in the annular plate and thereby control the flow of air through the inner of said concentric tubes, and means to move said annular plate and last mentioned means in succession.

18. A burner apparatus for liquid fuel furnaces having a pair of air supply tubes, one of said tubes being housed within the other to provide an air passage between the two, an annular plate movable axially of said tubes to approach and recede from the outer end of the space between the tubes whereby to regulate the flow of air therethrough, said annular plate having a central clearance to expose the opening through the inner tube, and guide means for said annular plate extended from one of said supply tubes.

19. A burner apparatus for liquid fuel furnaces having a pair of air supply tubes concentrically arranged to provide an annular air passage and a central air passage, the rear ends of said tubes being flush with each other, an annular plate movable toward and from said rear ends to cover and uncover the space between said tubes, said annular plate having a central clearance to expose the central air passage, and guide means for said annular plate extended from one of said supply tubes.

20. A burner apparatus for liquid fuel furnaces having a pair of air supply tubes concentrically arranged to provide an annular air passage and a central air passage, the rear ends of said tubes being flush with each other, an annular plate movable toward and from said rear ends to cover and uncover the space between said tubes, said annular plate having a central clearance to expose the central air passage, guide means for said annular plate extended from one of said supply tubes, and means independent of said plate for closing the inner tube.

21. A burner apparatus for liquid fuel furnaces having a pair of air supply tubes concentrically arranged to provide an annular air passage and a central air passage, the rear ends of said tubes being flush with each other, an annular plate movable toward and from said rear ends to cover and uncover the space between said tubes, said annular plate having a central clearance to expose the central air passage and being of greater diameter than the outer tube whereby to project therebeyond, and guide means for said annular plate extended from one of said supply tubes.

22. A burner apparatus for liquid fuel furnaces having a pair of air supply tubes concentrically arranged to provide an annular air passage and a central air passage, the rear ends of said tubes being flush with each other, an annular plate movable toward and from said rear ends to cover and uncover the space between said tubes, said annular plate having a central clearance to expose the central air passage and being of greater diameter than the outer tube whereby to project therebeyond, said projection portion being inclined forwardly with respect to the body of said plate, and guide means for said annular plate extended from one of said supply tubes.

Executed this 13th day of September, 1923.

JAMES McDONALD.